United States Patent
Kobayashi

(10) Patent No.: US 9,977,163 B2
(45) Date of Patent: May 22, 2018

(54) ORIENTATION LAYER FOR OPTICALLY ANISOTROPIC FILM

(71) Applicant: Sumitomo Chemical Company, Limited, Tokyo (JP)

(72) Inventor: Tadahiro Kobayashi, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days. days.

(21) Appl. No.: 14/783,308

(22) PCT Filed: Apr. 10, 2014

(86) PCT No.: PCT/JP2014/060882
§ 371 (c)(1),
(2) Date: Oct. 8, 2015

(87) PCT Pub. No.: WO2014/168256
PCT Pub. Date: Oct. 16, 2014

(65) Prior Publication Data
US 2016/0062013 A1    Mar. 3, 2016

(30) Foreign Application Priority Data
Apr. 11, 2013    (JP) .................................. 2013-082699

(51) Int. Cl.
*G02F 1/133*    (2006.01)
*G02B 5/30*    (2006.01)
(Continued)

(52) U.S. Cl.
CPC ......... *G02B 5/3016* (2013.01); *G02B 5/3083* (2013.01); *G02F 1/13363* (2013.01);
(Continued)

(58) Field of Classification Search
CPC .................................................. G02F 1/13363
See application file for complete search history.

(56) References Cited

U.S. PATENT DOCUMENTS

| 5,780,629 A | 7/1998 | Etzbach et al. |
| 6,217,792 B1 | 4/2001 | Parri et al. |

(Continued)

FOREIGN PATENT DOCUMENTS

| JP | H09506088 A | 6/1997 |
| JP | 2000515496 A | 11/2000 |

(Continued)

OTHER PUBLICATIONS

Handbook of Liquid Crystals, Chapter 3, Section 8-6, "Network (completely cross-linked type)" and Chapter 6, Section 5-1 "Liquid crystal material b. Polymerizable nematic liquid crystal material," ed: Ekisho Binran Henshu Iinkai, Maruzen Co., Ltd. (Oct. 30, 2000).

(Continued)

*Primary Examiner* — James Dudek
(74) *Attorney, Agent, or Firm* — Panitch Schwarze Belisario & Nadel LLP

(57) ABSTRACT

An orientation layer is provided for an optically anisotropic film disposed between a substrate and an optically anisotropic film. The orientation layer has an orientation regulating force vertically orienting a liquid crystal compound without being subjected to orienting treatment.

7 Claims, 1 Drawing Sheet

(51) Int. Cl.
  *G02F 1/1337* (2006.01)
  *G02F 1/13363* (2006.01)
  *G02F 1/1335* (2006.01)
(52) U.S. Cl.
  CPC .............. *G02F 1/133528* (2013.01); *G02F 2001/133742* (2013.01)

(56) References Cited

U.S. PATENT DOCUMENTS

| | | | |
|---|---|---|---|
| 6,723,395 | B2 | 4/2004 | May et al. |
| 7,136,225 | B2 | 11/2006 | Matsumoto et al. |
| 8,246,855 | B2 | 8/2012 | Hirai |
| 2007/0128379 | A1* | 6/2007 | Hirai ............... C09K 19/388 428/1.2 |
| 2012/0008224 | A1 | 1/2012 | Uchida |
| 2014/0002773 | A1* | 1/2014 | Hirai ............... C09K 19/3809 349/76 |
| 2014/0313581 | A1* | 10/2014 | Kashima ............ G02B 5/3016 359/489.07 |
| 2015/0070764 | A1* | 3/2015 | Hatanaka ............. B32B 27/00 359/489.07 |
| 2015/0185385 | A1* | 7/2015 | Kobayashi .......... G02B 5/3016 349/194 |
| 2016/0062013 | A1* | 3/2016 | Kobayashi .......... G02F 1/13363 349/75 |

FOREIGN PATENT DOCUMENTS

| | | |
|---|---|---|
| JP | 2003137887 A | 5/2003 |
| JP | 3708062 B2 | 10/2005 |
| JP | 2006057051 A | 3/2006 |
| JP | 2006098750 A | 4/2006 |
| JP | 2006171102 A | 6/2006 |
| JP | 2007078939 A | 3/2007 |
| JP | 2007148098 A | 6/2007 |
| JP | 2007169178 A | 7/2007 |
| JP | 2007176870 A | 7/2007 |
| JP | 2007225765 A | 9/2007 |
| JP | 2007269639 A | 10/2007 |
| JP | 2007269640 A | 10/2007 |
| JP | 2008209509 A | 9/2008 |
| JP | 2010031223 A | 2/2010 |
| JP | 4432487 B2 | 3/2010 |
| JP | 4502119 B2 | 7/2010 |
| JP | 2010270108 A | 12/2010 |
| JP | 4605016 B2 | 1/2011 |
| JP | 2011006360 A | 1/2011 |
| JP | 2011207765 A | 10/2011 |
| JP | 2012033249 A | 2/2012 |
| JP | 2012087197 A | 5/2012 |
| JP | 4985906 B2 | 7/2012 |
| WO | 2007122889 A1 | 11/2007 |
| WO | 2008117760 A1 | 10/2008 |

OTHER PUBLICATIONS

Liquid Crystal Device Handbook, Chapter 3, Section 4-3, "Chiral agent for TN and STN," ed: Japan Society for the Promotion of Science, 142 Committee, pp. 199-202, 210, 213 (1989).
International Search Report dated Jul. 8, 2014 in International Application No. PCT/JP2014/060882.
Office Action dated Dec. 26, 2017 in JP Application No. 2015-511324.

* cited by examiner

[Fig. 1]
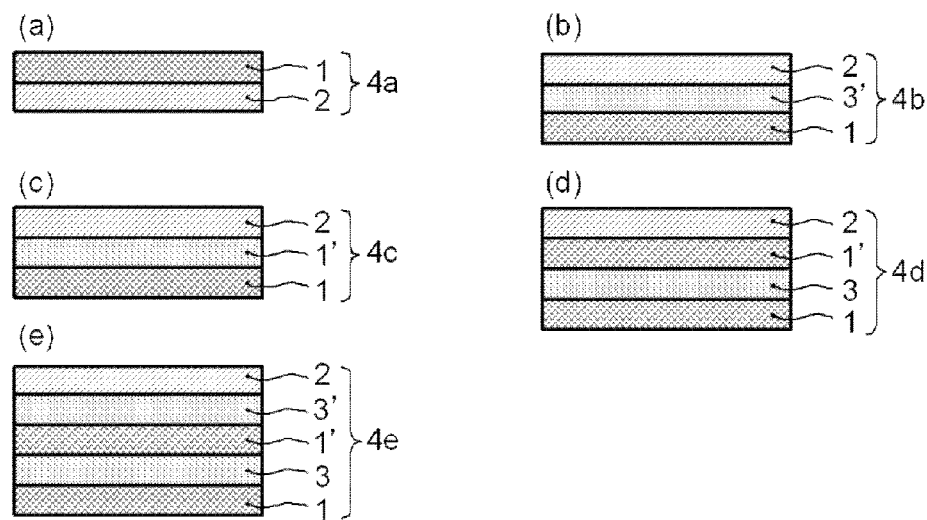
[Fig. 2]
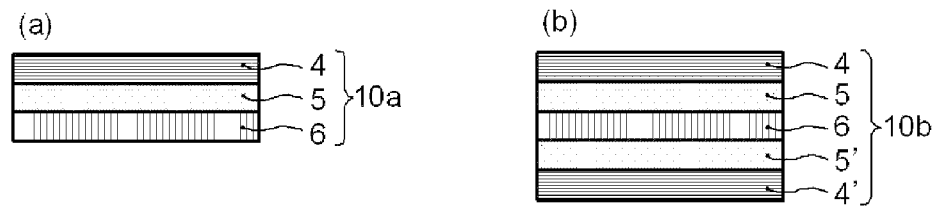

ORIENTATION LAYER FOR OPTICALLY ANISOTROPIC FILM

CROSS-REFERENCE TO RELATED APPLICATION

This application is a Section 371 of International Application No. PCT/JP2014/060882, filed Apr. 10, 2014, which was published in the Japanese language on Oct. 16, 2014, under International Publication No. WO 2014/168256 A1, and the disclosure of which is incorporated herein by reference.

TECHNICAL FIELD

The present invention relates to an orientation layer for an optically anisotropic film.

BACKGROUND ART

Patent Document 1 describes a method for producing an optical film by subjecting a substrate to orienting treatment, and coating liquid crystal compound onto the obtained orientation layer. Patent Document 1 describes that rubbing treatment was performed as orienting treatment.

PRIOR ART DOCUMENT

Patent Document

Patent Document 1: JP-A-2007-148098

SUMMARY OF THE INVENTION

Problems to be Solved by the Invention

Conventionally, defects sometimes occur in an optically anisotropic film formed on an orientation layer, due to fine dust generated by performing rubbing treatment.

Means for Solving the Problems

The present invention encompasses the following inventions.
[1] An orientation layer for an optically anisotropic film disposed between a substrate and an optically anisotropic film, the orientation layer having orientation regulating force vertically orienting liquid crystal compound without being subjected to orienting treatment.
[2] The orientation layer for an optically anisotropic film according to item [1], the contact angle of water being from 70° to 90°.
[3] The orientation layer for an optically anisotropic film according to item [1] or [2], including at least one kind of orienting polymer selected from polyimides and polyamic acids.
[4] The orientation layer for an optically anisotropic film according to any of items [1] to [3], including an orienting polymer having at least one kind of substituent selected from a silicon atom and a fluorine atom.
[5] The orientation layer for an optically anisotropic film according to any of items [1] to [4], the contact angle of a composition for forming an optically anisotropic layer being from 0° to 10°.
[6] An optically anisotropic film formed on the orientation layer for an optically anisotropic film according to any of items [1] to [5].
[7] The optically anisotropic film according to item [6], the contact angle of water on the surface of the optically anisotropic film being from 75° to 90°.
[8] The optically anisotropic film according to item [6], the film being for an in-plane switching (IPS) liquid crystal display device.
[9] A laminated body on which an optically anisotropic film is formed on the orientation layer for an optically anisotropic film according to any of items [1] to [5].
[10] A method for producing an optically anisotropic film, including continuously forming the orientation layer for an optically anisotropic film according to any of items [1] to [5] on a roll-form substrate, and continuously forming an optically anisotropic film thereon.
[11] A polarizing plate having the optically anisotropic film according to any of items [6] to [8].
[12] A display device, including the optically anisotropic film according to any of items [6] to [8].

Effect of the Invention

According to the present invention, an orientation layer for an optically anisotropic film that gives an optically anisotropic film with less numbers of defects can be provided.

BRIEF DESCRIPTION OF THE DRAWINGS

FIGS. 1(a) to 1(e) are each a cross-sectional schematic view showing an example of the polarizing plate according to the present invention.
FIGS. 2(a) and 2(b) are each a cross-sectional schematic view showing an example of the liquid crystal display device according to the present invention.

MODE FOR CARRYING OUT THE INVENTION

The orientation layer for an optically anisotropic film of the present invention is an orientation layer for an optically anisotropic film disposed between a substrate and an optically anisotropic film, which has orientation regulating force vertically orienting liquid crystal compound without being subjected to orienting treatment.
<Orientation Layer for Optically Anisotropic Film>
The orientation layer for an optically anisotropic film of the present invention (hereinafter, may be referred to as the present orientation layer) is disposed between a substrate and an optically anisotropic film, and the present orientation layer is formed by coating a composition for forming an orientation layer on the substrate, and drying the coated composition, without being subjected to orienting treatment. The orienting treatment refers to give orientation regulating force by performing rubbing treatment, photoirradiation and the like, on a coating layer made of the composition for forming an orientation layer. Since the present orientation layer is not subjected to orienting treatment, fine dust generated in orienting treatment such as rubbing is not generated. Further, the present orientation layer does not also require other orienting treatment such as photoirradiation, thus is high in productivity.

The thickness of the present orientation layer is usually from 10 nm to 10000 nm, preferably from 10 nm to 1000 nm, and more preferably from 20 nm to 200 nm. It is preferred when the thickness of the present orientation layer is in the above range, since the liquid crystal compound can be oriented on the present orientation layer without unevenness.

The contact angle of water of the present orientation layer is usually from 70° to 90°. The contact angle of water is preferably from 70° to 85°, and more preferably from 75° to 85°. It is preferred when the contact angle of water is in the above range, since orientation regulating force in the vertical direction tends to be obtained.

In the surface of the present orientation layer, the contact angle of the composition for forming an optically anisotropic layer set forth below is preferably from 0° to 10°.

It is preferred when the contact angle is in the above range, since it becomes possible to uniformly coat the composition for forming an optically anisotropic layer onto the surface of the present orientation layer, and defect occurrence of the obtained optically anisotropic film can be further suppressed.

The composition for forming an orientation layer usually contains an orienting polymer.

Examples of the orienting polymer include polyamides and gelatins, which each have amide bonds in the molecule, polyimides, which each have imide bonds in the molecule, polyamic acids, which are each a hydrolyzate of a polyimide, polyvinyl alcohols, alkyl-modified polyvinyl alcohols, polyacrylamides, polyoxazoles, polyethyleneimines, polystyrenes, polyvinyl pyrrolidones, polyacrylic acids, polyacrylates, and the like. Preferred are polyimides and polyamic acids. These polymers may be used alone, or may be a composition obtained by combining plural kinds of polymers, or a copolymer obtained by combining plural kinds of polymers. These polymers can be easily obtained by polycondensation such as dehydration and dealcoholization, chain polymerization such as radical polymerization, anion polymerization and cation polymerization, coordination polymerization, ring-opening polymerization or the like, of a monomer.

The orienting polymer preferably contains at least one kind of substituent selected from a silicon atom, a fluorine atom, and the like. For example, the substances generally used as a liquid crystal orientation layer of a vertically oriented liquid crystal display device, as described in Japanese Patent Nos. 4605016, 4985906 and 4502119, or WO2008/117760, can be used.

Examples of the commercially available orienting polymer include SUNEVER (registered trademark, manufactured by Nissan Chemical Industries, Ltd.), OPTMER (registered trademark, manufactured by JSR Corporation), and the like. Among them, particularly preferred is SUNEVER containing polyimide or a polyamic acid.

The composition for forming an orientation layer usually contains a solvent. By containing the solvent, coating on the substrate becomes easy, and formation of the present orientation layer becomes easy.

Examples of the solvent include water; alcohol solvents such as methanol, ethanol, ethylene glycol, isopropyl alcohol, propylene glycol, methylcellosolve, and butylcellosolve; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, methyl isobutyl ketone, and N-methyl-2-pyrrolidone; aliphatic hydrocarbon solvents such as pentane, hexane, and heptane; aromatic hydrocarbon solvents such as toluene, xylene, and chlorobenzene; nitrile solvents such as acetonitrile; ether solvents such as propylene glycol monomethyl ether, tetrahydrofuran, and dimethoxyethane; halogenated hydrocarbon solvents such as chloroform; and the like. Such organic solvents may be used alone or in combination.

The content of the solvent is usually 10 parts by mass to 100000 parts by mass, preferably 1000 parts by mass to 50000 parts by mass, and more preferably 2000 parts by mass to 20000 parts by mass, related to 100 parts by mass of the solid content.

In the present invention, orientation regulating force is defined as the function of the orientation layer that is capable of controlling the orientation of the liquid crystal compound set forth below.

The orientation layer used in a general liquid crystal cell is used for controlling the orientation direction of the liquid crystal compound filled in the voltage-off state, and can set the orientation of the compound in the liquid crystal state. Orientation regulating force that returns the orientation of the liquid crystal substance after voltage driving to the off state is required to the orientation layer. A compound in the liquid crystal state itself has an orientation property, thus application to a liquid crystal cell was possible as long as the orientation layer had a certain orientation regulating force.

On the other hand, the present orientation layer can attain orientation of the liquid crystal compound only by coating a solution of liquid crystal compound not in the liquid crystal state and drying the coated solution.

<Substrate>

A transparent substrate is usually used as the substrate. The transparent substrate means a substrate having such a translucency that light, in particular, visible rays can be transmitted through the substrate. Translucency denotes a property that the transmittance to light rays having wavelengths from 380 nm to 780 nm is 80% or more. Specific examples of the transparent substrate include glass and translucent resin substrates, and preferred is a translucent resin substrate. As the substrate, a substrate in a film form is usually used. Among them, a film roll substrate in which unwinding and winding are possible in a roll-to-roll manner is particularly preferred in productivity.

Examples of the resin that constitutes the translucent resin substrate include polyolefins such as polyethylene, polypropylene, and norbornene-based polymers; polyvinyl alcohols; polyethylene terephthalate; polymethacrylates; polyacrylates; cellulose esters; polyethylene naphthalate; polycarbonates; polysulfones; polyethersulfones; polyetherketones; polyphenylenesulfides; polyphenylene oxides; and the like. Preferred are polyolefins such as polyethylene, polypropylene and norbornene-based polymers, polyethylene terephthalate, and polymethacrylates. More preferred are such polyolefins.

The substrate may be subjected to surface treatment. Examples of the method for the surface treatment include a method of treating a surface of the substrate with corona or plasma in a vacuum or an atmospheric pressure; a method of treating a surface of the substrate with a laser; a method of treating a surface of the substrate with ozone; a method of subjecting a surface of the substrate to saponifying treatment or a method of subjecting a surface of the substrate to flame treatment; a method of coating a coupling agent onto a surface of the substrate to subject to primer treatment; a graft-polymerization method of causing a reactive monomer or a polymer having reactivity to adhere onto a surface of the substrate, and then irradiating the monomer or polymer with radial rays, plasma or ultraviolet rays thereto to cause a reaction of the monomer or polymer; and the like. Among them, preferred is the method of treating a surface of the substrate with corona or plasma in a vacuum or an atmospheric pressure.

Examples of the method of treating a surface of the substrate with corona or plasma include a method of setting the substrate between opposed electrodes under a pressure close to the atmospheric pressure, and generating corona or plasma to treat the surface of the substrate therewith;

a method of causing a gas to flow into the gap between opposed electrodes, making the gas into plasma between the electrodes, and blowing the plasma-state gas onto the substrate; and a method of generating glow discharge plasma under a low pressure to treat the surface of the substrate therewith.

Among them, preferred are the method of setting the substrate between opposed electrodes under a pressure close to the atmospheric pressure, and then generating corona or plasma to treat the surface of the substrate therewith, and the method of causing a gas to flow into the gap between opposed electrodes, making the gas into plasma between the electrodes, and blowing the plasma-state gas onto the substrate. Usually, these surface treatments with corona or plasma can be conducted in a commercially available surface treatment apparatus.

<Optically Anisotropic Film>

The optically anisotropic film in the present invention (hereinafter may be referred to as the present optical film) contains vertically oriented liquid crystal compound. The present optical film is formed from a composition for forming an optically anisotropic layer, and the composition for forming an optically anisotropic layer contains a solvent, besides the liquid crystal compound, and further may contain a polymerization initiator, a polymerization inhibitor, a photosensitizer, a leveling agent, a chiral agent, a reactive additive, and the like. When the liquid crystal compound are polymerizable liquid crystal compound, the present optical film preferably contains a polymerization initiator.

The thickness of the present optical film can be properly adjusted, depending on its use or the retardation value of the display device to be stacked, and is usually from 0.1 µm to 10 µm, preferably from 0.2 µm to 5 µm, and more preferably from 0.3 µm to 2 µm. It is preferred when the thickness is in the above range, since photoelasticity can be suppressed.

The contact angle of water of the surface of the present optical film is usually from 75° to 90°. The contact angle of water is preferably from 75° to 85°, and more preferably from 75° to 85°. The liquid crystal compound are selected such that the contact angle of water of the surface of the present optical film is in the above range, whereby the liquid crystal compound are likely to orient in the vertical direction.

The vertical orientation denotes that the liquid crystal compound have a long axis along a direction vertical to the substrate surface.

Examples of the liquid crystal compound include a compound containing a group represented by a formula (X) (hereinafter, may be referred to as the "compound (X)").

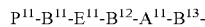 (X)

wherein $P^{11}$ represents a polymerizable group or a hydrogen atom;

$A^{11}$ represents a bivalent alicyclic hydrocarbon group or bivalent aromatic hydrocarbon group provided that any hydrogen atom contained in the bivalent alicyclic hydrocarbon group and bivalent aromatic hydrocarbon group is optionally substituted with a halogen atom, an alkyl group having 1 to 6 carbon atoms, an alkoxy group having 1 to 6 carbon atoms, a cyano group or a nitro group provided that any hydrogen atom contained in the alkyl group having 1 to 6 carbon atoms or the alkoxy group having 1 to 6 carbon atoms is optionally substituted with a fluorine atom;

$B^{11}$ represents —O—, —S—, —CO—O—, —O—CO—, —O—CO—O—, —CO—NR$^{16}$—, —NR$^{16}$—CO—, —CO—, —CS— or a single bond wherein R$^{16}$s each represent a hydrogen atom or an alkyl group having 1 to 6 carbon atoms;

$B^{12}$ and $B^{13}$ each independently represent —C≡C—, —CH=CH—, —CH$_2$—CH$_2$—, —O—, —S—, —C(=O)—, —C(=O)—O—, —O—C(=O)—, —O—C(=O)—O—, —CH=N—, —N=CH—, —N=N—, —C(=O)—NR$^{16}$—, —NR$^{16}$—C(=O)—, —OCH$_2$—, —OCF$_2$—, —CH$_2$O—, —CF$_2$O—, —CH=CH—C(=O)—O—, —O—C(=O)—CH=CH—, or a single bond;

$E^{11}$ represents an alkanediyl group having 1 to 12 carbon atoms provided that any hydrogen atom contained in the alkanediyl group is optionally substituted with an alkoxy group having 1 to 5 carbon atoms provided that any hydrogen atom contained in the alkoxy group is optionally substituted with a halogen atom; and also, any —CH$_2$— that constitutes the alkanediyl group is optionally replaced with —O— or —CO—.

The number of the carbon atoms of the aromatic hydrocarbon group and alicyclic hydrocarbon group as $A^{11}$ is preferably in the range of 3 to 18, more preferably in the range of 5 to 12, and particularly preferably 5 or 6. $A^{11}$ is preferably a cyclohexane-1,4-diyl group or a 1,4-phenylene group.

$E^{11}$ is preferably a linear alkanediyl group having 1 to 12 carbon atoms. Any —CH$_2$— that constitutes the alkanediyl group is optionally replaced with —O—.

Specific examples thereof include linear alkanediyl groups having 1 to 12 carbon atoms, such as methylene, ethylene, propane-1,3-diyl, butane-1,4-diyl, pentane-1,5-diyl, hexane-1,6-diyl, heptane-1,7-diyl, octane-1,8-diyl, nonane-1,9-diyl, decane-1,10-diyl, undecane-1,11-diyl, and dodecane-1,12-diyl groups; —CH$_2$—CH$_2$—O—CH$_2$—CH$_2$—, —CH$_2$—CH$_2$—O—CH$_2$—CH$_2$—O—CH$_2$—CH$_2$—, and —CH$_2$—CH$_2$—O—CH$_2$—CH$_2$—O—CH$_2$—CH$_2$—O—CH$_2$—CH$_2$—; and the like.

$B^{11}$ is preferably —O—, —S—, —CO—O—, or —O—CO—, and more preferably —CO—O—.

$B^{12}$ and $B^{13}$ are each independently preferably —O—, —S—, —C(=O)—, —C(=O)—O—, —O—C(=O)—, or —O—C(=O)—O—, and more preferably —O— or —O—C(=O)—O—.

$P^{11}$ is preferably a polymerizable group. The polymerizable group is preferably a radical polymerizable group or cation polymerizable group in that the group is high in polymerization reactivity, in particular, photopolymerization reactivity. The polymerizable group is preferably a group represented by any one of the following formulae (P-11) to (P-15) since the liquid crystal compound having the group are easy to handle, and is also easily produced:

(P-11)

(P-12)

(P-13)

-continued

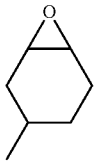
(P-14)

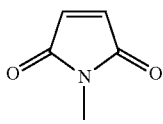
(P-15)

wherein $R^{17}$ to $R^{21}$ each independently represent an alkyl group having 1 to 6 carbon atoms, or a hydrogen atom.

Specific examples of the group represented by any one of the formulae (P-11) to (P-15) include respective groups represented by the following formulae (P-16) to (P-20):

(P-16)

(P-17)

(P-18)

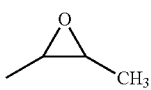
(P-19)

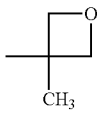
(P-20)

$P^{11}$ is preferably a group represented by any one of the formulae (P-14) to (P-20), and more preferably a vinyl, p-stilbene group, epoxy or oxetanyl group.

Further preferably, the group represented by $P^{11}$-$B^{11}$- is an acryloyloxy or methacryloyloxy group.

Examples of the compound (X) include respective compounds represented by the formulae (I), (II), (III), (IV), (V) or (VI):

$$P^{11}\text{-}B^{11}\text{-}E^{11}\text{-}B^{12}\text{-}A^{11}\text{-}B^{13}\text{-}A^{12}\text{-}B^{14}\text{-}A^{13}\text{-}B^{15}\text{-}A^{14}\text{-}B^{16}\text{-}E^{12}\text{-}B^{17}\text{-}P^{12} \quad (I)$$

$$P^{11}\text{-}B^{11}\text{-}E^{11}\text{-}B^{12}\text{-}A^{11}\text{-}B^{13}\text{-}A^{12}\text{-}B^{14}\text{-}A^{13}\text{-}B^{15}\text{-}A^{14}\text{-}F^{11} \quad (II)$$

$$P^{11}\text{-}B^{11}\text{-}E^{11}\text{-}B^{12}\text{-}A^{11}\text{-}B^{13}\text{-}A^{12}\text{-}B^{14}\text{-}A^{13}\text{-}B^{15}\text{-}E^{12}\text{-}B^{17}\text{-}P^{12} \quad (III)$$

$$P^{11}\text{-}B^{11}\text{-}E^{11}\text{-}B^{12}\text{-}A^{11}\text{-}B^{13}\text{-}A^{/2}\text{-}B^{14}\text{-}A^{13}\text{-}F^{11} \quad (IV)$$

$$P^{11}\text{-}B^{11}\text{-}E^{11}\text{-}B^{12}\text{-}A^{11}\text{-}B^{13}\text{-}A^{12}\text{-}F^{11} \quad (IV)$$

wherein $A^{12}$ to $A^{14}$ each independently have the same meaning as $A^{11}$; $B^{14}$ to $B^{16}$ each independently have the same meaning as $B^{12}$; $B^{17}$ has the same meaning as $B^{11}$; and $E^{12}$ has the same meaning as $E^{11}$; and $F^{11}$ represents a hydrogen atom, an alkyl group having 1 to 13 carbon atoms, an alkoxy group having 1 to 13 carbon atoms, a cyano group, a nitro group, a trifluoromethyl group, a dimethylamino group, a hydroxy group, a methylol group, a formyl group, a sulfo group (—$SO_3H$), a carboxy group, an alkoxycarbonyl group having 1 to 10 carbon atoms, or a halogen atom, provided that any —$CH_2$— that constitutes the alkyl group and alkoxy group is optionally replaced with —O—.

Specific examples of the liquid crystal compound include compounds described in "3.8.6 Network (Completely Crosslinked Type)" and "6.5.1 Liquid Crystal Material, b. Polymerizable Nematic Liquid Crystal Material" in "Liquid Crystal Handbook" (edited by Liquid Crystal Handbook Editorial Committee, and publishedbyMaruzen Publishing Co., Ltd. on Oct. 30, 2000); liquid crystal compound described in JP-A-2010-31223, JP-A-2010-270108, JP-A-2011-6360, and JP-A-2011-207765; and the like.

Specific examples of the compound (X) include compounds represented by following formulae (I-1) to (I-4), formulae (II-1) to (II-4), formulae (III-1) to (III-26), formulae (IV-1) to (IV-26), formulae (V-1) to (V-2), and formulae (VI-1) to (VI-6). In the following formulae, k1 and k2 each independently represent an integer of 2 to 12. These compounds (X) are preferred in that the compounds are easily synthesized or are easily available.

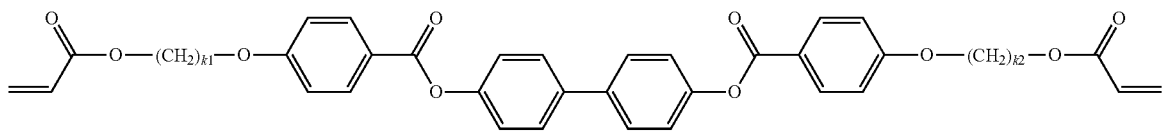
(I-1)

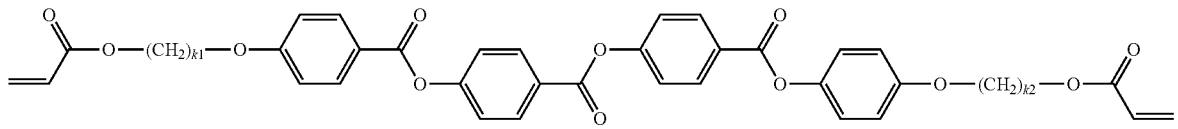
(I-2)

-continued
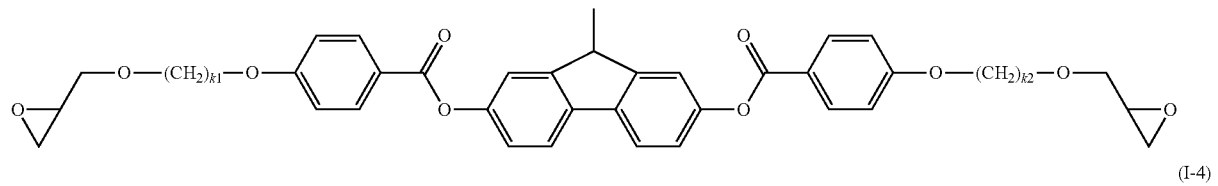
(I-3)
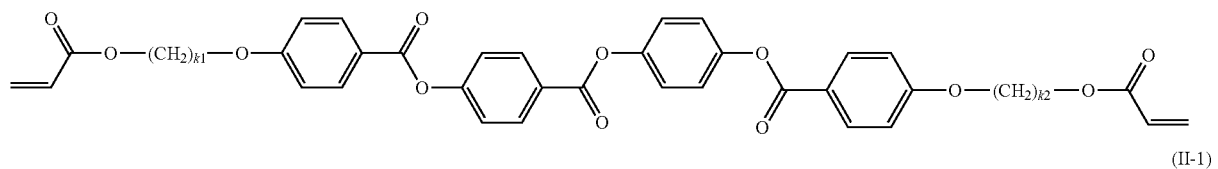
(I-4)
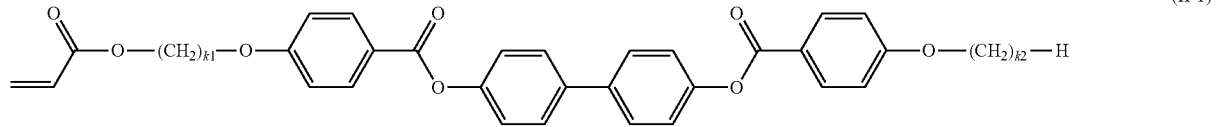
(II-1)
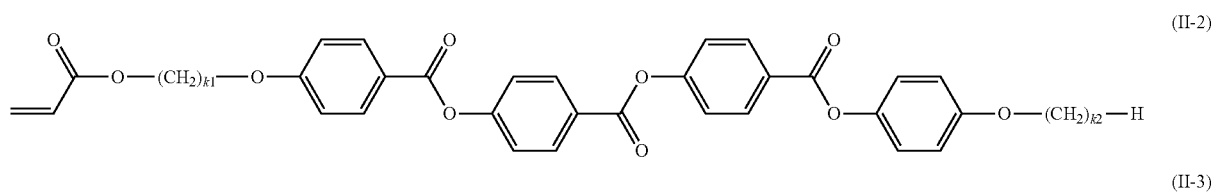
(II-2)
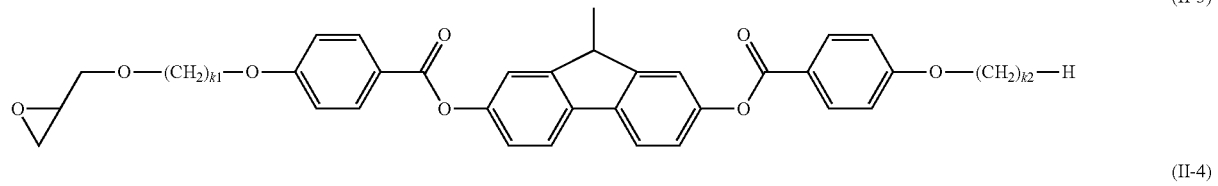
(II-3)
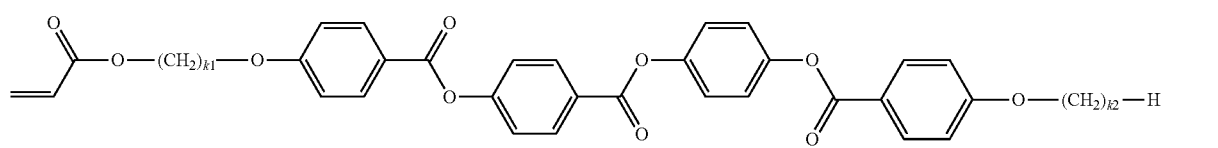
(II-4)
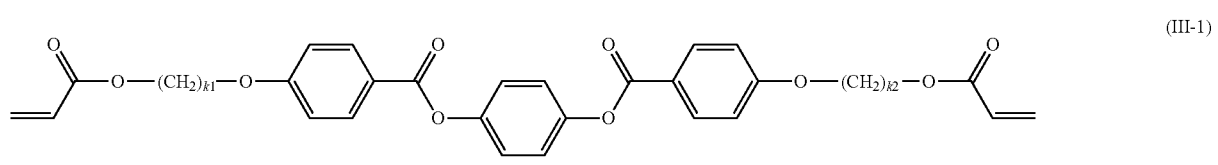
(III-1)
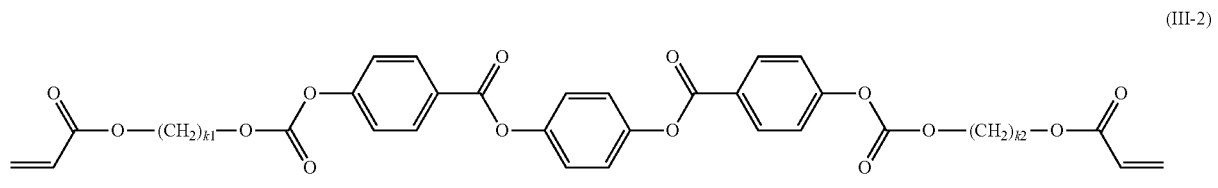
(III-2)
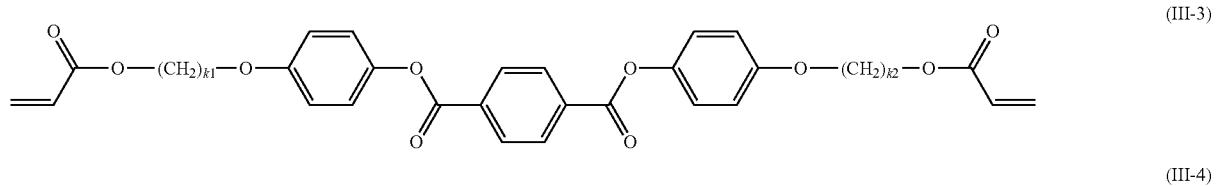
(III-3)
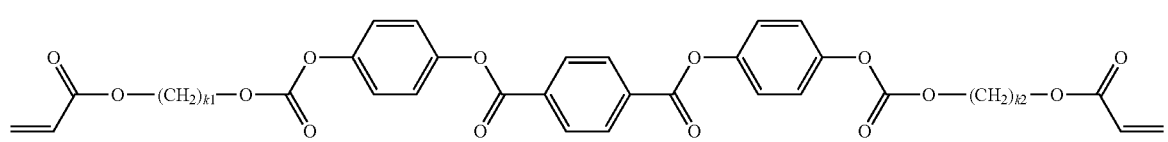
(III-4)

-continued
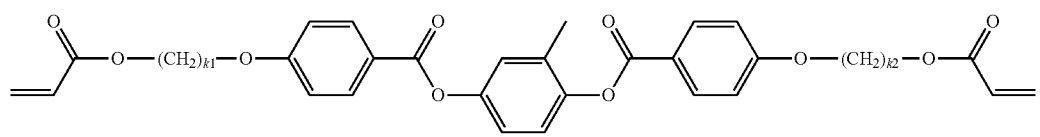
(III-5)
(III-6)
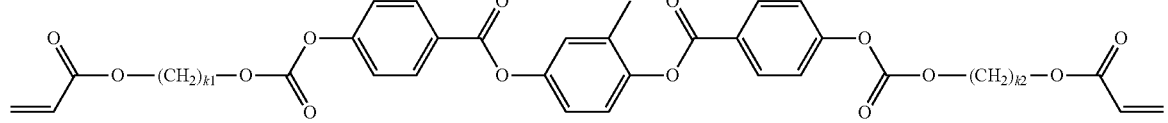
(III-7)
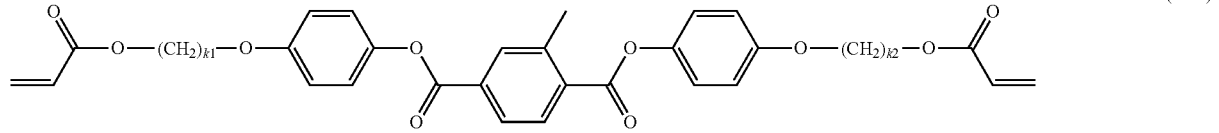
(III-8)
(III-9)
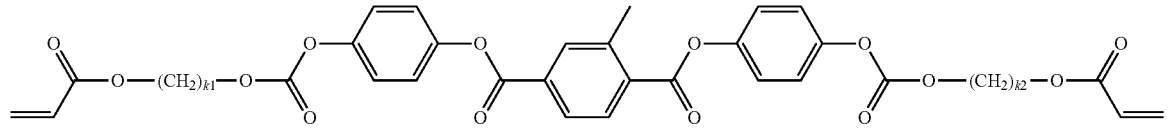
(III-10)
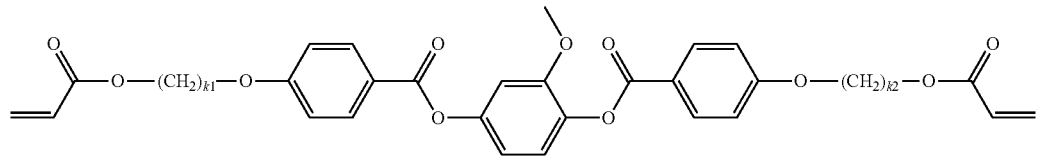
(III-11)
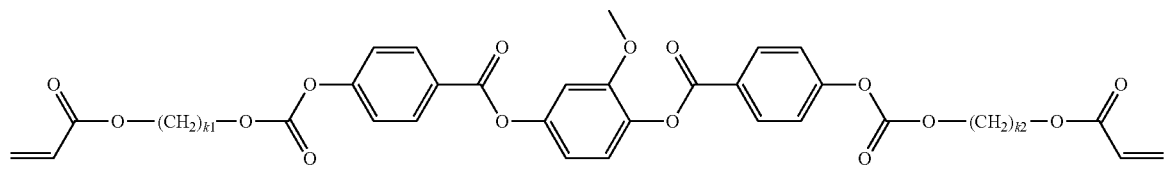
(III-12)
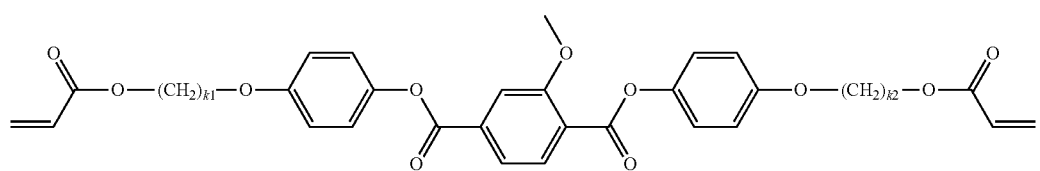
(III-13)
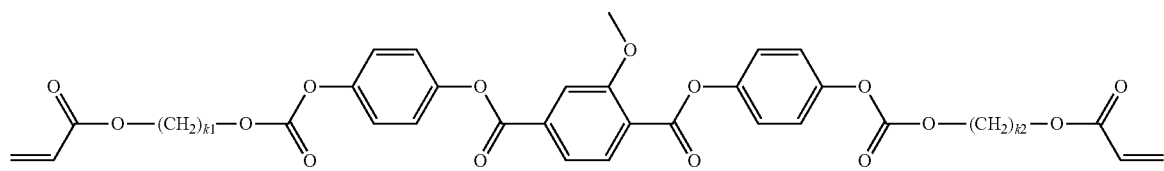
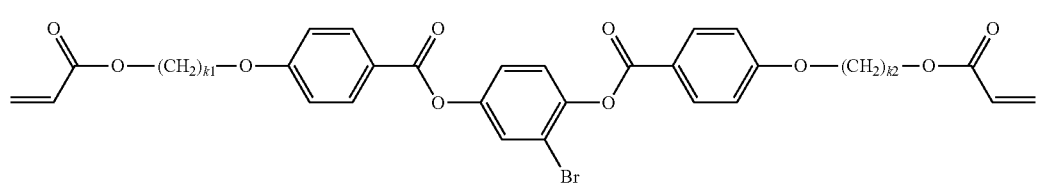

-continued
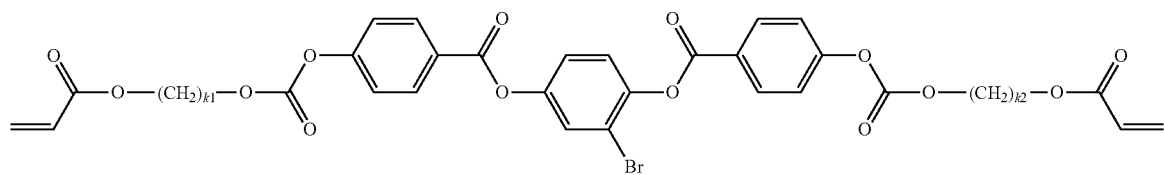
(III-14)
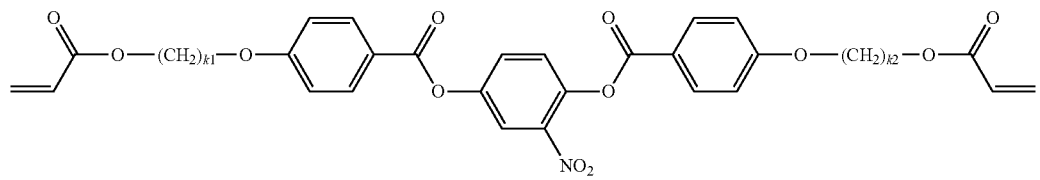
(III-15)
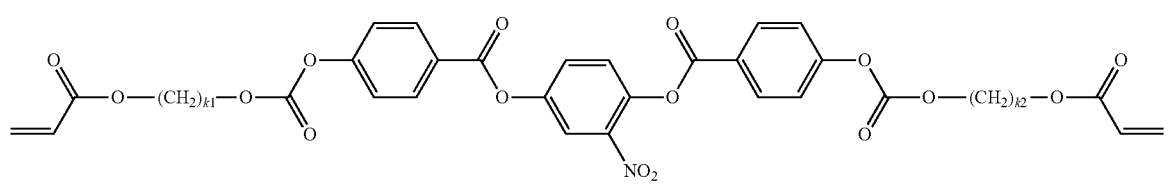
(III-16)
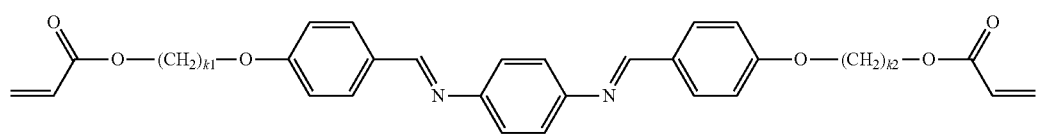
(III-17)
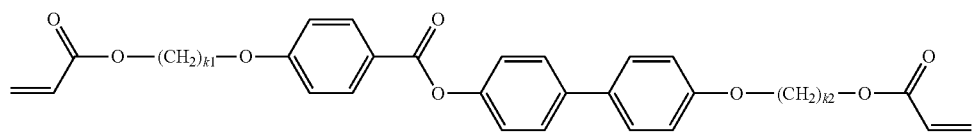
(III-18)
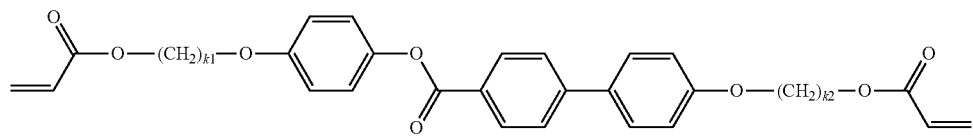
(III-19)
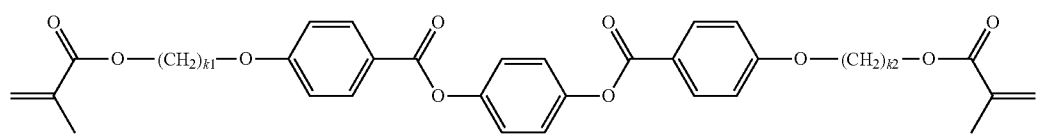
(III-20)
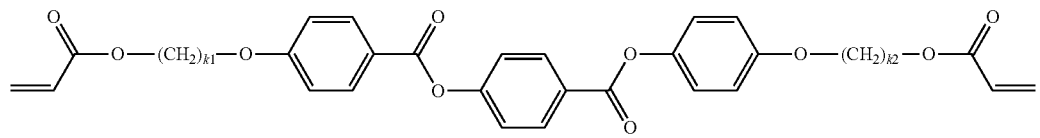
(III-21)
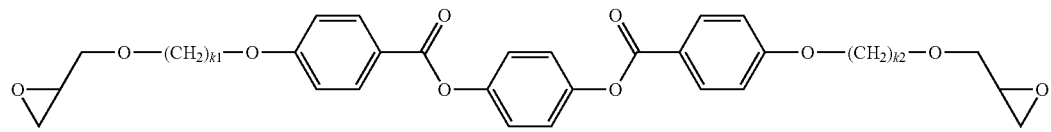
(III-22)
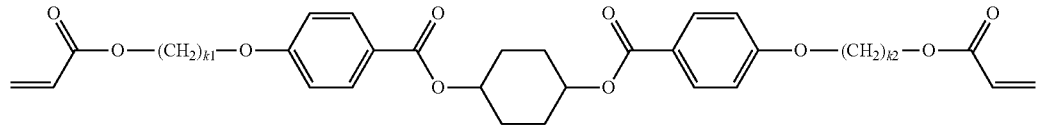
(III-23)

-continued
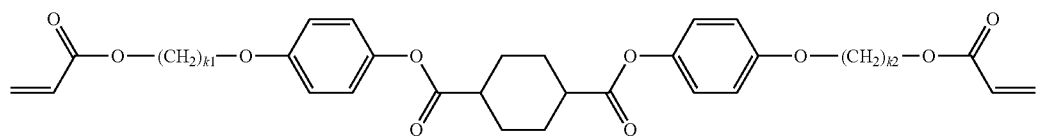 (III-24)
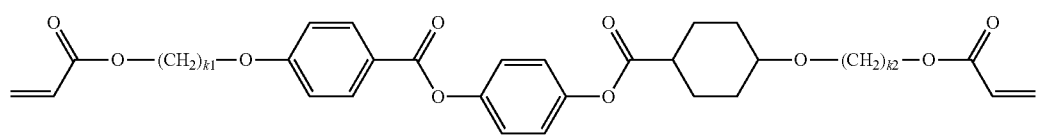 (III-25)
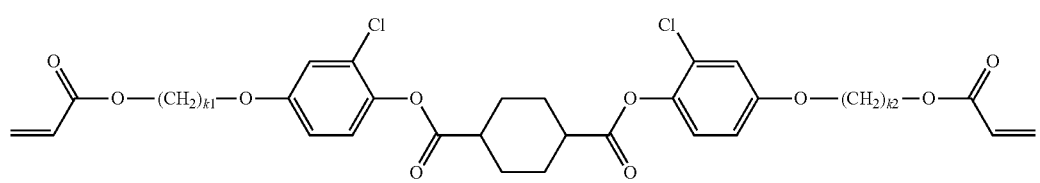 (III-26)
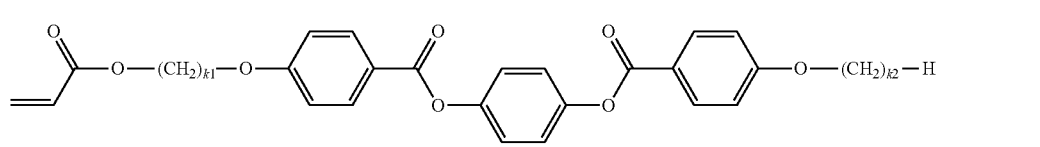 (IV-1)
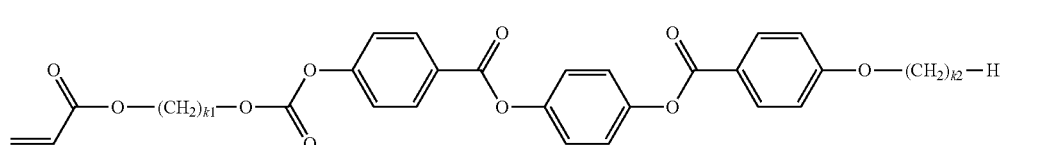 (IV-2)
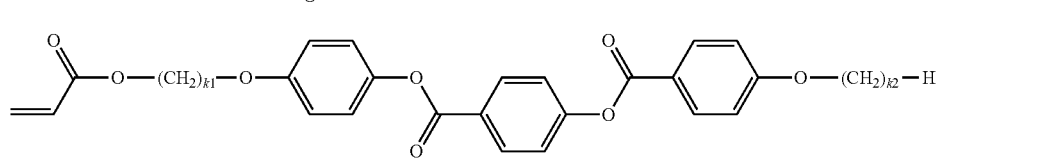 (IV-3)
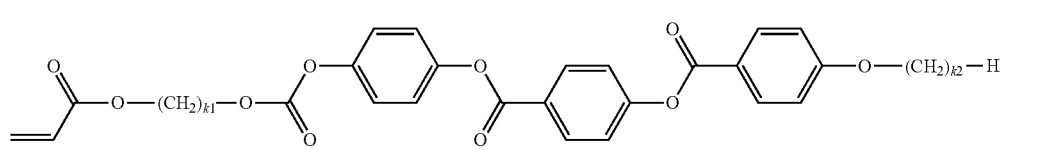 (IV-4)
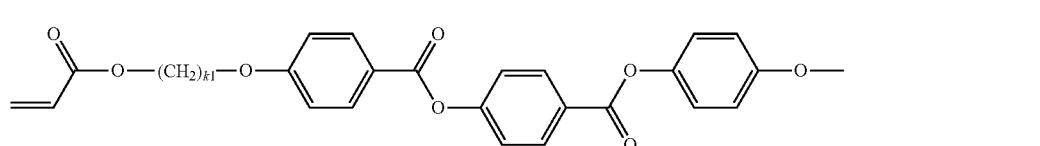 (IV-5)
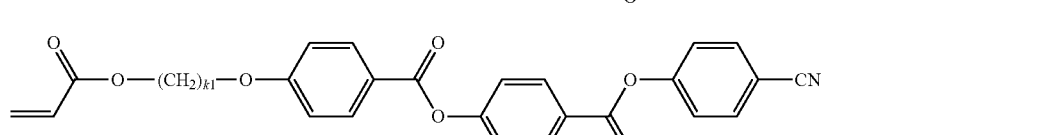 (IV-6)
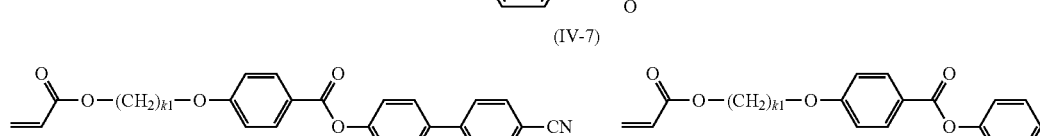 (IV-7)
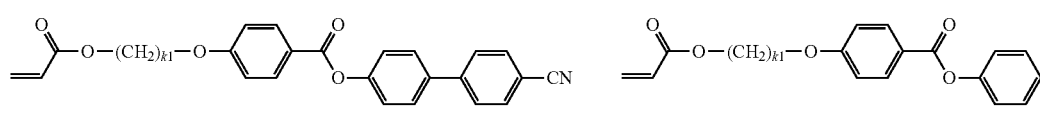 (IV-8)
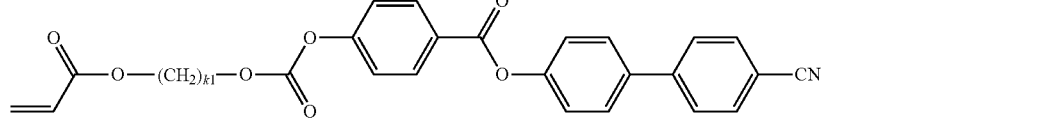 (IV-9)

-continued
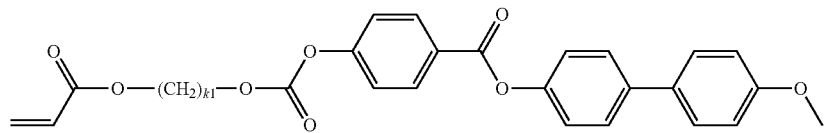
(IV-10)
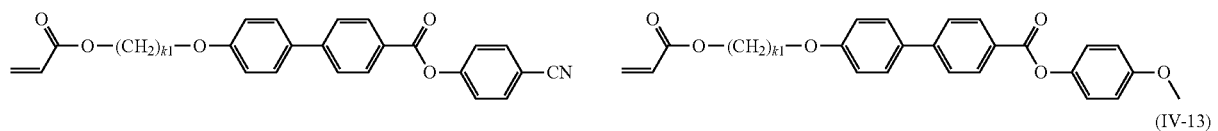
(IV-11)
(IV-12)
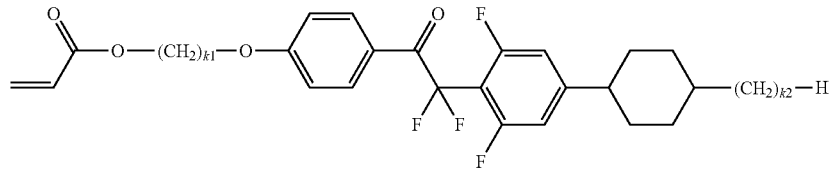
(IV-13)
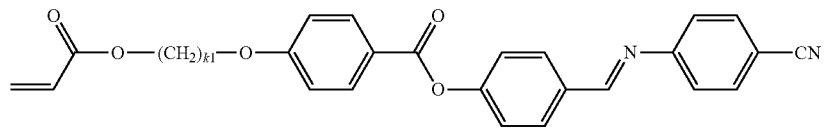
(IV-14)
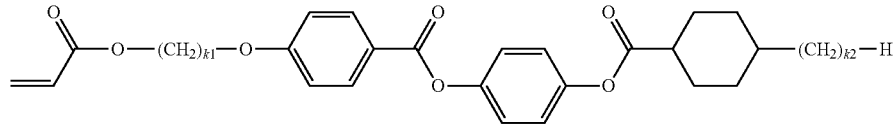
(IV-15)
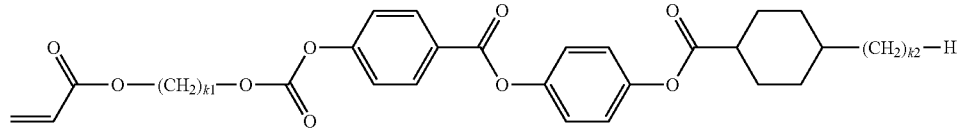
(IV-16)
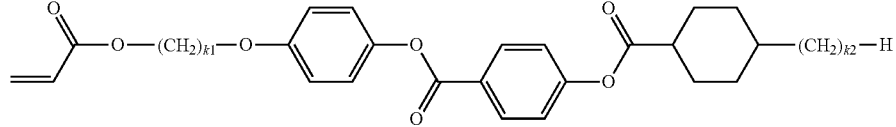
(IV-17)
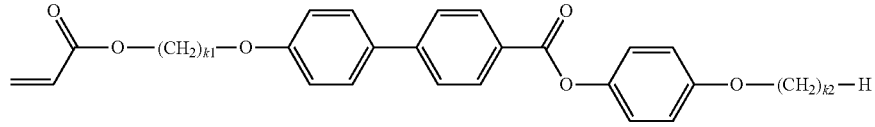
(IV-18)
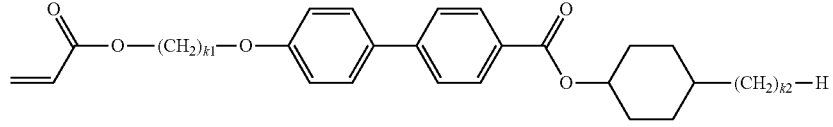
(IV-19)
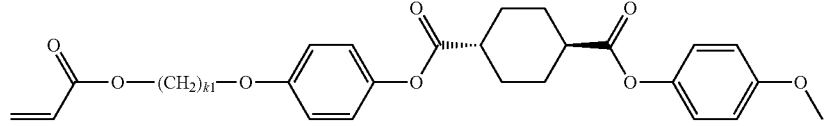
(IV-20)
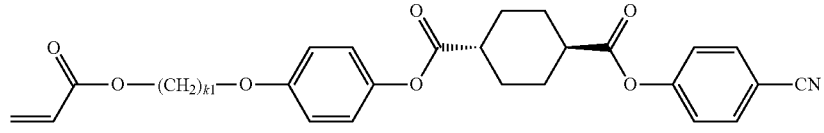
(IV-21)

-continued
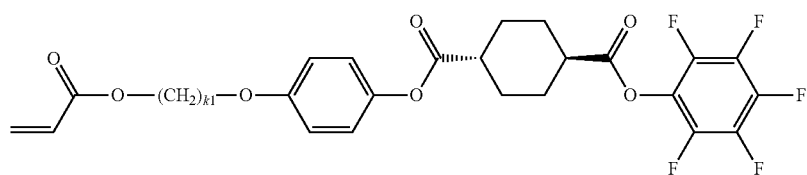
(IV-22)
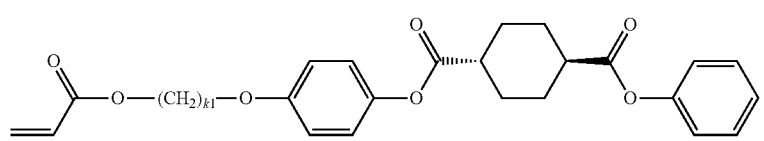
(IV-23)
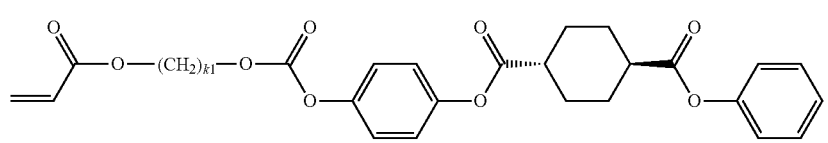
(IV-24)
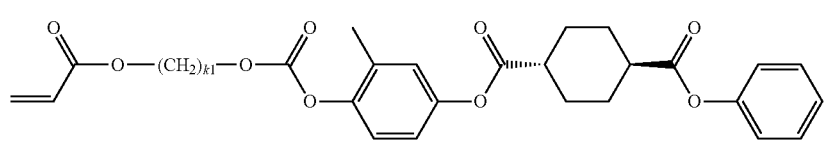
(IV-25)
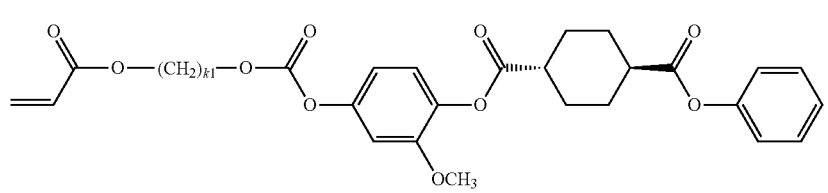
(IV-26)
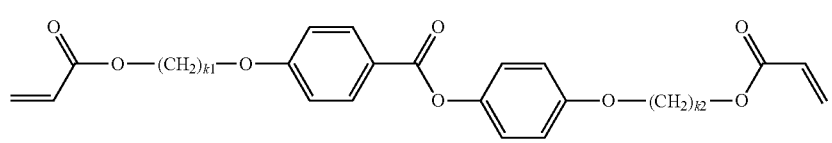
(V-1)
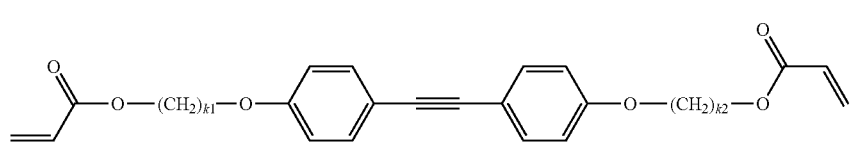
(V-2)
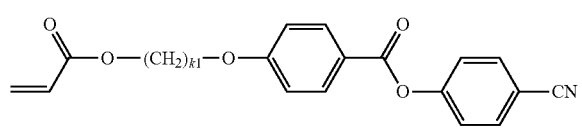
(VI-1)
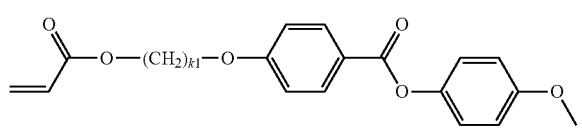
(VI-2)
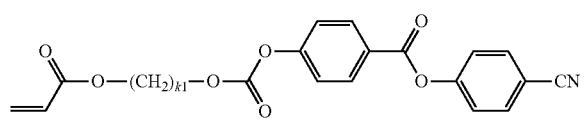
(VI-3)
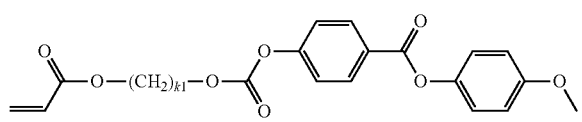
(VI-4)
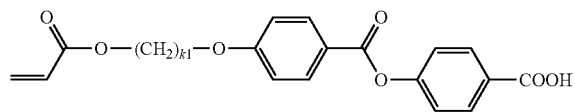
(VI-5)
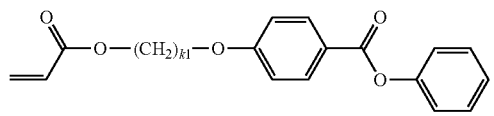
(VI-6)

[Solvent]

The composition for forming an optically anisotropic layer contains a solvent.

As the solvent, an organic solvent that can dissolve constituents of the composition for forming an optically anisotropic layer such as the liquid crystal compound is preferred, and when the composition for forming an optically anisotropic layer contains polymerizable liquid crystal compound, an organic solvent that is inert to the polymerization reaction of the polymerizable liquid crystal compound is further preferred. Specific examples thereof include alcohol solvents such as methanol, ethanol, ethylene glycol, isopropyl alcohol, propylene glycol, methylcellosolve, butylcellosolve, propylene glycol monomethyl ether, and phenol; ester solvents such as ethyl acetate, butyl acetate, ethylene glycol methyl ether acetate, y-butyrolactone, propylene glycol methyl ether acetate, and ethyl lactate; ketone solvents such as acetone, methyl ethyl ketone, cyclopentanone, cyclohexanone, methyl amyl ketone, and methyl isobutyl ketone; non-chlorinated aliphatic hydrocarbon solvents such as pentane, hexane, and heptane; non-chlorinated aromatic hydrocarbon solvents such as toluene and xylene; nitrile solvents such as acetonitrile; ether solvents such as tetrahydrofuran and dimethoxyethane; chlorinated hydrocarbon solvents such as chloroform and chlorobenzene; and the like. Such organic solvents may be used in combination of two or more thereof. Among them, preferred are alcohol solvents, ester solvents, ketone solvents, non-chlorinated aliphatic hydrocarbon solvents, and non-chlorinated aromatic hydrocarbon solvents.

The content of the solvent is preferably from 10 parts by mass to 10000 parts by mass, and more preferably from 100 parts by mass to 5000 parts by mass, related to 100 parts by mass of the solid content. The solid concentration in the composition for forming an optically anisotropic layer is preferably from 2% by mass to 50% by mass, and more preferably from 5% to 50% by mass. The "solid content" means the entire components excluding the solvent from the composition for forming an optically anisotropic layer.

[Polymerization Initiator]

The polymerization initiator is preferably a photopolymerization initiator, and more preferably a photopolymerization initiator which generates radicals by photoirradiation.

Examples of the polymerization initiator include benzoin compounds, benzophenone compounds, benzyl ketal compounds, α-hydroxyketone compounds, α-aminoketone compounds, triazine compounds, iodonium salts and sulfonium salts. Specific examples thereof include IRGACURE 907, IRGACURE 184, IRGACURE 651, IRGACURE 819, IRGACURE 250, and IRGACURE 369 (all manufactured by Ciba Japan K.K.); SEIKUOL BZ, SEIKUOL Z, and SEIKUOL BEE (all manufactured by Seiko Chemical Co., Ltd.); KAYACURE BP100 (manufactured by Nippon Kayaku Co., Ltd.); KAYACURE UVI-6992 (manufactured by the Dow Chemical Company); ADEKA OPTOMER SP-152, and ADEKA OPTOMER SP-170 (all manufactured by Adeka Corporation); and TAZ-A and TAZ-PP (all manufactured by Nihon Siber Hegner K.K.), and TAZ-104 (manufactured by Sanwa Chemical Co., Ltd.). Among them, preferred are α-acetophenone compounds. Examples of the α-acetophenone compounds include 2-methyl-2-morpholino-1-(4-methylsulfanylphenyl)propan-1-one, 2-dimethylamino-1-(4-morpholinophenyl)-2-benzylbutan-1-one, 2-dimethylamino-1-(4-morpholinophenyl)-2-(4-methylphenylmethyl)butane-1-one, and the like. More preferred are 2-methyl-2-morpholino-1-(4-methylsulfanylphenyl)propane-1-one, and 2-dimethylamino-1-(4-morpholinophenyl)-2-benzylbutan-1-one. Commercially available product examples of the α-acetophenone compounds include IRGACUREs 369, 379EG and 907 (all manufactured by BASF Japan Ltd.), SEIKUOL BEE (manufactured by Seiko Chemical Co., Ltd.), and the like.

The content of the polymerization initiator is usually from 0.1 parts by mass to 30 parts by mass, and preferably from 0.5 parts by mass to 10 parts by mass, related to 100 parts by mass of the liquid crystal compound. It is preferred in the above range since the orientation of the polymerizable liquid crystal compound is not hardly disturbed.

[Polymerization Inhibitor]

Examples of the polymerization inhibitor include hydroquinone and hydroquinones each having a substituent such as an alkyl ether; catechols each having a substituent such as an alkyl ether, such as butylcatechol; radical scavengers such as pyrogallols and 2,2,6,6-tetramethyl-1-piperidinyloxy radicals; thiophenols; β-naphthylamines; and β-naphthols.

The content of the polymerization inhibitor in the composition for forming an optically anisotropic layer is usually from 0.1 parts by mass to 30 parts by mass, and preferably from 0.5 parts by mass to 10 parts by mass, related to 100 parts by mass of the liquid crystal compound. It is preferred in the above range since the orientation of the liquid crystal compound is not hardly disturbed.

[Photosensitizer]

Examples of the photosensitizer include xanthones such as xanthone and thioxanthone; anthracene, and anthracenes such as anthracene having a substituent such as an alkyl ether; phenothiazine; and rubrene.

The use of the photosensitizer makes it possible to heighten the sensitivity of the reaction of the photopolymerization initiator. The content of the photosensitizer is usually from 0.1 parts by mass to 30 parts by mass, and preferably from 0.5 parts by mass to 10 parts by mass, related to 100 parts by mass of the liquid crystal compound.

[Leveling Agent]

Examples of the leveling agent include organic modified silicone oil-based, polyacrylate-based, and perfluoroalkyl-based leveling agents. Specific examples thereof include DC3PA, SH7PA, DC11PA, SH28PA, SH29PA, SH30PA, ST80PA, ST86PA, SH8400, SH8700 and FZ2123 (all manufactured by Dow Corning Toray Co., Ltd.); KP321, KP323, KP324, KP326, KP340, KP341, X22-161A and KF6001 (all manufactured by Shin-Etsu Chemical Co., Ltd.); and TSF400, TSF401, TSF410, TSF4300, TSF4440, TSF4445, TSF-4446, TSF4452 and TSF4460 (all manufactured by Momentive Performance Materials Inc.), FLUORINERTs (registered trademark) FC-72, FC-40, FC-43 and FC-3283 (all manufactured by Sumitomo 3M Limited); MEGAFACs (registered trademark) R-08, R-30, R-90, F-410, F-411, F-443, F-445, F-470, F-477, F-479, F-482 and F-483 (all manufactured by DIC Corporation); EFTOPs (trade name) EF301, EF303, EF351 and EF352 (all manufactured by Mitsubishi Materials Electronic Chemicals Co., Ltd.); SURFLONs (registered trademark) S-381, S-382, S-383, S-393, SC-101, SC-105, KH-40 and SA-100 (all manufactured by AGC Seimi Chemical Co., Ltd.); E1830 and E5844 (trade names) (manufactured by Daikin Fine Chemical Laboratory Co., Ltd.); and BM-1000, BM-1100, BYK-352, BYK-353 and BYK-361N (trade names) (manufactured by BM Chemie GmbH). Such leveling agents may be used in any combination of two or more thereof.

It is possible to obtain a smoother optically anisotropic film by the leveling agent. Also, it is possible to control the fluidity of the composition for forming an optically anisotropic layer or adjust the crosslinking density of the optically anisotropic film in the production process of the optically anisotropic film. The content of the leveling agent is usually from 0.1 parts by mass to 30 parts by mass, and preferably from 0.1 parts by mass to 10 parts by mass, related to 100 parts by mass of the liquid crystal compound.

[Chiral Agent]

Examples of the chiral agent include known chiral agents (for example, agents described in "Liquid Crystal Device Handbook", Chapter 3, 4-3, Chiral Agents for TN and STN, p. 199, edited by Japan Society for the Promotion of Science, the 142nd Committee, 1989).

The chiral agent generally contains an asymmetric carbon atom, but an axially asymmetric compound or planarly asymmetric compound, which contains no asymmetric carbon atom, can be also used as the chiral agent. Examples of the axially asymmetric compound or planarly asymmetric compound include binaphthyl, helicene, paracyclophane, and derivatives of these compounds.

Specific examples thereof include compounds as described in JP-A-2007-269640, JP-A-2007-269639, JP-A-2007-176870, JP-A-2003-137887, JP-W-2000-515496, JP-A-2007-169178, and JP-W-09-506088, and preferred is Paliocolor (registered trademark) LC756 manufactured by BASF Japan Ltd.

The content of the chiral agent is usually from 0.1 parts by mass to 30 parts by mass, and preferably from 1.0 parts by mass to 25 parts by mass, related to 100 parts by mass of the liquid crystal compound. It is preferred in the above range since the orientation of the polymerizable liquid crystal compound is not hardly disturbed.

[Reactive Additive]

The reactive additive is preferably a compound having in the molecule thereof a carbon-carbon unsaturated bond and an active hydrogen reactive group. The "active hydrogen reactive group" herein means a group reactive with a group having active hydrogen such as a carboxyl group (—COOH), hydroxyl group (—OH) or amino group (—NH$_2$). Typical examples thereof are glycidyl, oxazoline, carbodiimide, aziridine, imide, isocyanate, thioisocyanate, maleic anhydride groups, and the like.

It is preferred that the reactive additive has at least two active hydrogen reactive groups. In this case, a plurality of the active hydrogen reactive groups may be the same as or different from each other.

The carbon-carbon unsaturated bond that the reactive additive has may be a carbon-carbon double bond, a carbon-carbon triple bond, or a combination of the two, and is preferably a carbon-carbon double bond. Among them, it is preferred that the reactive additive contains a carbon-carbon unsaturated bond as a vinyl group and/or a (meth)acrylic group. Furthermore, the reactive additive is preferably one having, as its active hydrogen reactive group(s), at least one selected from the group consisting of epoxy, glycidyl and isocyanate groups; and is particularly preferably a reactive additive having an acrylic group and an isocyanate group.

Specific examples of the reactive additive include compounds each having a (meth)acrylic group and an epoxy group, such as methacryloxy glycidyl ether and acryloxy glycidyl ether; compounds each having a (meth)acrylic group and an oxetane group, such as oxetane acrylate and oxetane methacrylate; compounds each having a (meth) acrylic group and a lactone group, such as lactone acrylate and lactone methacrylate; compounds each having a vinyl group and an oxazoline group, such as vinyl oxazoline and isopropenyl oxazoline; oligomers of a compound having a (meth) acrylic group and an isocyanate group, such as isocyanatomethylacrylate, isocyanatomethyl methacrylate, 2-isocyanatoethyl acrylate, and 20 isocyanatoethyl methacrylate, and the like. Also, other examples thereof include compounds each having a vinyl group or vinylene group and an acid anhydride, such as methacrylic anhydride, acrylic anhydride, maleic anhydride, and vinylmaleic anhydride, and the like. Among them, preferred are methacryloxy glycidyl ether, acryloxy glycidyl ether, isocyanatomethyl acrylate, isocyanatomethyl methacrylate, vinyl oxazoline, 2-isocyanatoethyl acrylate, 2-isocyanatoethyl methacrylate, and the above-mentioned oligomers. Particularly preferred are isocyanatomethyl acrylate, 2-isocyanatoethyl acrylate, and the above-mentioned oligomers.

Here, those having an isocyanate group as the active hydrogen reactive group that are more preferred as the reactive additive are specifically shown. For example, such a preferred reactive additive is represented by the following formula (Y):

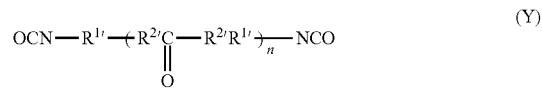

wherein n represents an integer of 1 to 10, $R^1$'s each represent a bivalent aliphatic or alicyclic hydrocarbon group having 2 to 20 carbon atoms, or a bivalent aromatic hydrocarbon group having 5 to 20 carbon atoms; one of two $R^2$'s in each of the recurring units is a group represented by —NH— and the other is a group represented by >N—C(=O)—$R^{3\prime}$ wherein $R^{3\prime}$ represents a hydroxyl group or a group having a carbon-carbon unsaturated bond; and at least one of $R^3$'s is a group having a carbon-carbon unsaturated bond.

Of the reactive additives represented by the formula (Y), particularly preferred is a compound represented by the following formula (YY) in which n has the same meaning as described above (hereinafter the compound may be referred to as the "compound (YY)"):

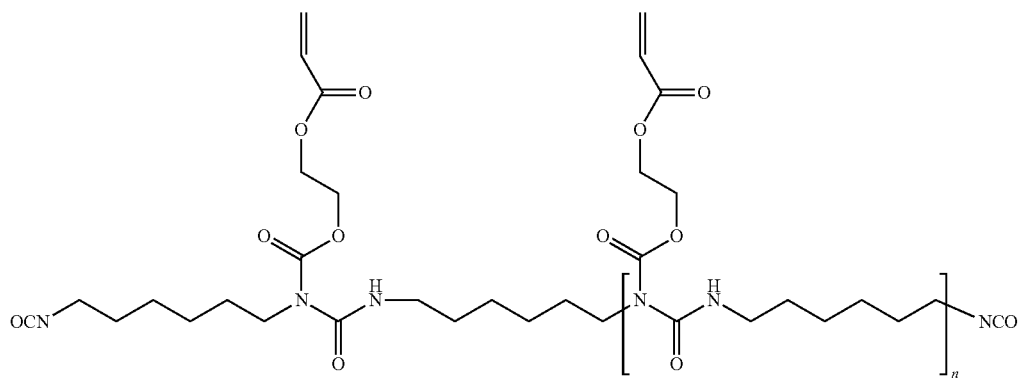

As the compound (YY), a commercially available product is usable as it is, or after being purified if necessary. Examples of the commercially available product include Laromer (registered trademark) LR-9000 (manufactured by BASF) and the like.

The content of the reactive additive is usually from 0.1 parts by mass to 30 parts by mass, and preferably from 0.1 parts by mass to 5 parts by mass, related to 100 parts by mass of the liquid crystal compound.

<Method for Producing Optically Anisotropic Film Using Present Orientation Layer>

The methods for producing the present optical film formed on the present orientation layer and a laminated body in which the present optical film is formed on the present orientation layer include the following steps (1) to (4). Orienting treatment is not performed between the steps (2) and (3). When the liquid crystal compound contained in the composition for forming an optically anisotropic layer are polymerizable liquid crystal compound, further, the production methods preferably include the step (5). The following steps (1) to (5) are preferably continuously performed using a rolled-form substrate:

(1) a step of coating a composition for forming an orientation layer onto a substrate;
(2) a step of drying the coated composition for forming an orientation layer to form the present orientation layer;
(3) a step of coating a composition for forming an optically anisotropic layer onto the formed present orientation layer;
(4) a step of drying the coated composition for forming an optically anisotropic layer to obtain a dry coating; and
(5) a step of photoirradiating the obtained dry coating, and polymerizing the polymerizable liquid crystal compound.

<Step (1)>

Examples of the method for coating a composition for forming an orientation layer onto a substrate include extrusion coating, direct gravure coating, reverse gravure coating, CAP coating, die coating, roll coating, bar coating, and the like. Also, examples include a method of the coating using a coater such as a dip coater, a bar coater, or a spin coater.

<Step (2)>

The coated composition for forming an orientation layer is dried, thereby forming the present orientation layer on the substrate.

Examples of the method of drying the composition for forming an orientation layer include natural drying, ventilation drying, heat drying, and reduced-pressure drying; and any combination of these methods. The drying temperature is preferably from 10° C. to 250° C., more preferably from 40° C. to 200° C., and further preferably from 60° C. to 150° C. The drying time, which depends on the kind of the solvent, is preferably from 5 seconds to 60 minutes, and more preferably from 10 seconds to 30 minutes.

<Step (3)>

Examples of the method of coating a composition for forming an optically anisotropic layer onto the present orientation layer include the same method as the method of coating a composition for forming an orientation layer described above. Among them, any method of bar coating, die coating, gravure coating or roll coating is preferred in that these methods make it possible to continuously coat a composition for forming an optically anisotropic layer onto the present orientation layer in a roll-to-roll manner. When the composition is coated in a roll-to-roll manner, it is also allowable to coat a composition for forming an orientation layer onto the substrate to form the present orientation layer on the substrate, and further continuously coat a composition for forming an optically anisotropic layer onto the obtained present orientation layer.

<Step (4)>

The coated composition for forming an optically anisotropic layer is dried to obtain dry coating of the vertically oriented liquid crystal compound.

When the vertically oriented liquid crystal compound exhibit a liquid crystal phase such as a nematic phase, the obtained dry coating has a birefringence property based on mono-domain orientation. Namely, the dry coating is an optically anisotropic film.

Examples of the drying method include ventilation drying, heat drying, and reduced-pressure drying; and any combination of these methods. Among them, preferred is heat drying. The drying temperature is usually in the range of 0° C. to 250° C., preferably in the range of 50° C. to 220° C., and more preferably in the range of 60° C. to 170° C. When the liquid crystal compound have a solid-liquid crystal phase transition temperature at a temperature lower than the temperature in which the solvent is removable, the drying temperature is preferably a temperature in which the solvent is removable. When the liquid crystal compound have a solid-liquid crystal phase transition temperature at a temperature higher than the temperature in which the solvent is removable, the drying temperature is preferably a temperature higher than or equal to the solid-liquid crystal phase transition temperature of the liquid crystal compound. A liquid crystal phase is formed on the present orientation layer, whereby the liquid crystal compound can spontaneously orient in the vertical direction, and easily exhibit optical anisotropy.

The drying time is usually from 10 seconds to 60 minutes, and preferably from 30 seconds to 30 minutes.

<Step (5)>

When the liquid crystal compound contained in the dry coating are polymerizable liquid crystal compound, it is preferred to irradiate the obtained dry coating with light to polymerize the polymerizable liquid crystal compound.

Examples of the light include visible rays, ultraviolet rays, a laser ray, and the like. Among them, preferred is ultraviolet rays. According to the ultraviolet rays, the liquid crystal compound can be polymerized at a low temperature; thus, choices for the substrate to be used are increased in light of the heat resistance.

Examples of a lamp for irradiating ultraviolet rays include a high-pressure mercury lamp, an intermediate-pressure mercury lamp, a low-pressure mercury lamp, a metal halide lamp, and the like. Among them, preferred are a high-pressure mercury lamp, a low-pressure mercury lamp, and a metal halide lamp.

In the present optical film obtained by polymerizing polymerizable liquid crystal compound, the orientation of the polymerizable liquid crystal compound is fixed, so that the present optical film is not easily affected by a birefringence change by heat.

The production method has no orienting treatment step, thus, for example, there is no generation of waste accompanying the rubbing treatment, and occurrence of orientation defect is suppressed.

The present optical film may be used as a laminated body laminated with the substrate, or the substrate and the present orientation layer, and may be used by removing the substrate, or the substrate and the present orientation layer.

The present optical film not having the substrate, or the substrate and the present orientation layer, is usually combined with other member such as a polarization film via an adhesive.

Examples of the method for combining with other member via an adhesive include a method of bonding the present optical film not having the substrate, or the substrate and the present orientation layer, onto other member using an adhesive; a method of bonding the present optical film formed on the surface of the present orientation layer formed on the surface of the substrate, onto other member using an adhesive, then removing the substrate, or the substrate and the present orientation layer; and the like. At this time, the adhesive may be coated onto the present optical film, and may be coated onto other member.

The present optical film is useful as a retardation film used for converting a linearly polarized light when confirming from the oblique angle of a light emission side to a circularly polarizing light or an elliptically polarizing light, converting a circularly polarizing light or an elliptically polarizing light to a linearly polarized light, and converting the polarization direction of a linearly polarized light, and particularly useful as a retardation film for an in-plane switching (IPS) liquid crystal display device.

The present optical film is also excellent in transparency in a visible light region, and can be used as a member for various display devices.

The present optical film may be used laminated in a plural number, and may be used combined with other film. The present optical film with different optical properties is laminated in a plural number, or the present optical film is combined with other film, whereby the laminated body can be used as a viewing angle compensating film, a viewing angle enlarging film, an anti-reflection film, a polarizing plate, a circularly polarizing plate, an elliptically polarizing plate, or a brightness enhancement film.

When the refractive index in the in-plane slow axis direction thereof is represented by $n_x$, that in the direction orthogonal to the in-plane slow axis (the fast axis direction) by $n_y$, and that in the thickness direction thereof by $n_z$, general retardation films can be classified as follows. The present optical film is particularly preferably used as a positive C plate.

a positive A plate in which $n_x > n_y \approx n_z$, a negative C plate in which $n_x \approx n_y > n_z$, a positive C plate in which $n_x \approx n_y < n_z$, and a positive O plate and a negative O plate in which $n_x \neq n_y \neq n_z$ When the present optical film is used as a positive C plate, it is advisable to adjust the front retardation value Re(549) usually into the range of 0 nm to 10 nm, and preferably into that of 0 nm to 5 nm, and adjust the retardation value $R_{th}$ in thickness direction usually into the range of −10 nm to −300 nm, and preferably into that of −20 nm to −200 nm. The front retardation value Re(549) is preferably properly selected in accordance with properties of a liquid crystal cell.

The retardation value $R_{th}$ in thickness direction, which means the refractive index anisotropy in the thickness direction, can be calculated from the retardation value $R_{50}$ measured in the state of inclining the in-plane fast axis at 50 degrees to be rendered an inclined axis, and the in-plane retardation value $R_0$. Specifically, the retardation value $R_{th}$ in thickness direction can be calculated by obtaining $n_x$, $n_y$, and $n_z$ through the following equations (9) to (11), from the in-plane retardation value $R_0$, the retardation value $R_{50}$, which is measured in the state of inclining the fast axis at 50 degrees to be rendered an inclined axis, the thickness d of the film, and the average refractive index $n_0$ of the film; and then substituting these values into an equation (8).

$$R_{th} = [(n_x + n_y)/2 - n_z] \times d \tag{8}$$

$$R_0 = (n_x - n_y) \times d \tag{9}$$

$$R_{50} = (n_x - n_y') \times d/\cos(\varphi) \tag{10}$$

$$(n_x + n_y + n_z)/3 = n_0 \tag{11}$$

wherein $\varphi = \sin^{-1}[\sin(50°)/n_0]$ $n_y' = n_y \times n_z / [n_y^2 \times \sin^2(\varphi) + n_z^2 \times \cos^2(\varphi)]^{1/2}$ The present optical film and the laminated body having the present optical film are also useful as a member which constitutes a polarizing plate. The polarizing plate of the present invention contains at least one of the present optical films, and may be contained as a retardation film.

Specific examples of the polarizing plate include polarizing plates shown in FIGS. 1(a) to 1(e). The polarizing plate 4a shown in FIG. 1(a) is a polarizing plate in which a retardation film 1 and a polarization film 2 are laminated directly onto each other. The polarizing plate 4b shown in FIG. 1(b) is a polarizing plate in which a retardation film 1 and a polarization film 2 are stuck through an adhesive layer 3'. The polarizing plate 4c shown in FIG. 1(c) is a polarizing plate in which retardation films 1 and 1' are laminated onto each other and further a polarization film 2 is laminated onto the retardation film 1'. The polarizing plate 4d shown in FIG. 1(d) is a polarizing plate in which retardation films 1 and 1' are bonded onto each other through an adhesive layer 3, and further a polarization film 2 is laminated onto the retardation film 1'. The polarizing plate 4e shown in FIG. 1(e) is a polarizing plate in which retardation films 1 and 1' are bonded onto each other through an adhesive layer 3, and further the retardation film 1' and a polarization film 2 are bonded onto each other through an adhesive layer 3'. The "adhesive" denotes a generic name of any adhesive and/or any pressure-sensitive adhesive.

It is sufficient for the polarization film 2 to be a film having a polarizing function. Examples of the polarization film include a drawn film to which a dye having absorption anisotropy is adsorbed, a film onto which a dye having absorption anisotropy is coated, and the like. Examples of the dye having absorption anisotropy include dichroic dyes such as iodine and azo compounds.

Examples of the drawn film to which a dye having absorption anisotropy is adsorbed include a film obtained by adsorbing a dichroic dye to a polyvinyl alcohol-based film, and then drawing the resultant; a film obtained by drawing a polyvinyl alcohol-based film, and then adsorbing a dichroic dye to the resultant; and the like.

Examples of the film onto which a dye having absorption anisotropy is coated include a film obtained by coating a composition containing a dichroic dye having liquid crystal property, or coating a composition containing a dichroic dye and polymerizable liquid crystal compound, and the like.

The film having a polarizing function preferably has a protection film on one surface or both surfaces thereof. Examples of the protection film include those identical to the above-mentioned substrates.

Specific examples of the drawn film to which a dye having absorption anisotropy is adsorbed include polarizing plates described in Japanese Patent Nos. 3708062 and 4432487, and the like.

Specific examples of the film onto which a dye having absorption anisotropy is coated include polarization films described in JP-A-2012-33249 and the like.

The adhesive used for the adhesive layers 3 and 3' is preferably an adhesive with high transparency and excellent heat resistance. Examples of such adhesive include acrylic-based, epoxy-based and urethane-based adhesives.

The display device of the present invention includes the present optical film. Examples of the display device include a liquid crystal display device equipped with a liquid crystal panel in which the present optical film and a liquid crystal panel are stuck with each other, and an organic electroluminescence (hereinafter also referred to as "EL") display device equipped with an organic EL panel in which the present optical film and a luminous layer are stuck with each other. A liquid crystal display device will be described as an embodiment of the display device equipped with the present optical film.

Examples of the liquid crystal display device include liquid crystal display devices 10a and 10b shown in FIGS. 2(a) and 2(b), respectively. In the liquid crystal display device 10a shown in FIG. 2(a), the polarizing plate 4 of the present invention and a liquid crystal panel 6 are stuck through an adhesion layer 5. In the liquid crystal display device 10b shown in FIG. 2(b), the polarizing plate 4 of the present invention is stuck to one surface of a liquid crystal panel 6 through an adhesion layer 5 while the polarizing plate 4' of the present invention is stuck to the other surface of the liquid crystal panel 6 through an adhesion layer 5'. Electrodes not shown are used in these liquid crystal display devices to apply a voltage to their liquid crystal panel to change the orientation of liquid crystal molecules. In this way, a monochrome display can be realized.

EXAMPLES

Hereinafter, the present invention will be more specifically described by way of examples, but is not limited to the following examples. In the examples, the symbol "%" and the word "part(s)" denote "% by mass" and "part(s) by mass", respectively, unless otherwise specified.

[Preparation of Composition for Forming Orientation Layer]

Composition of a composition for forming an orientation layer is shown in Table 1. N-methyl-2-pyrrolidone, 2-butoxyethanol and ethylcyclohexane were added to a commercially available orienting polymer, SUNEVER SE-610 (manufactured by Nissan Chemical Industries, Ltd.) to yield a composition for forming an orientation layer (1).

TABLE 1

| | Solid content of SE-610 | N-Methyl-2-pyrrolidone | 2-Butoxyethanol | Ethyl-cyclohexane |
|---|---|---|---|---|
| Composition for forming an orientation layer (1) | 1.0% | 71.8% | 18.1% | 9.1% |

The value in Table 1 represents the proportion of the content of each component in the total amount of the prepared composition.

About the SE-610, the solid content was obtained by conversion from the concentration described in a delivery specification thereof.

[Preparation of Composition for Forming Optically Anisotropic Layer]

Composition of a composition for forming an optically anisotropic layer is shown in Table 2. The individual components were mixed with each other, and the resultant solution was stirred at 80° C. for 1 hour, and then cooled to room temperature to yield a composition for forming an optically anisotropic layer (1).

TABLE 2

| | Liquid crystal compound (X) | Photo-polymerization initiator | Leveling agent | Additive | Solvent |
|---|---|---|---|---|---|
| Composition for forming an optically anisotropic layer (1) | LC242 (19.2%) | Irg907 (0.5%) | BYK-361N (0.1%) | LR9000 (1.1%) | PGMEA (79.1%) |

The value in parentheses in Table 2 represents the proportion of the content of each component in the total amount of the prepared composition.

In Table 2, LR9000 represents Laromer (registered trademark) LR-9000 manufactured by BASF Japan Ltd.; Irg907 represents IRGACURE 907 manufactured by BASF Japan Ltd.; BYK-361N represents a leveling agent manufactured by BYK Japan K.K.; LC242 represents polymerizable liquid crystal compound manufactured by BASF represented by the following formula; and PGMEGA represents propylene glycol-1-monomethyl ether-2-acetate.

LC242

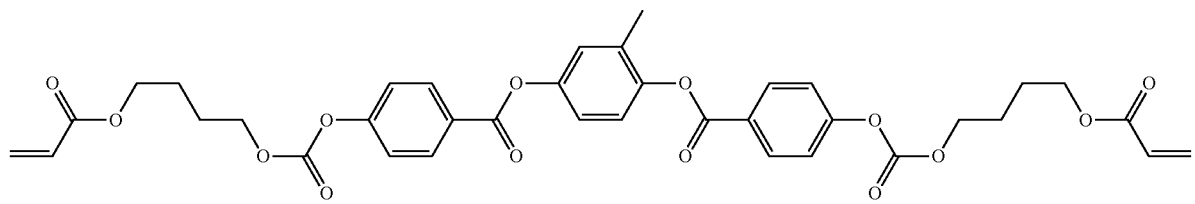

Example 1

The surface of a cycloolefin polymer film (ZF-14, manufactured by Zeon Corporation) was once treated using a corona treating apparatus (AGF-B10, manufactured by Kasuga Electric Works Ltd.) at a power of 0.3 kw and a treating rate of 3 m/minute. The composition for forming an orientation layer (1) was coated onto the corona-treated surface and dried at 90° C. for 1 minute. The thickness of the resultant orientation layer was measured using a laser microscope (LEXT, manufactured by Olympus Corporation) and found to be 34 nm. Subsequently, the composition for forming an optically anisotropic layer (1) was coated onto the orientation layer using a bar coater, and dried at 90° C. for 1 minute. Thereafter, polymerization was performed by irradiating the workpiece with ultraviolet ray at an integrated light quantity of 1000 mJ/cm² at a wavelength of 365 nm using a high-pressure mercury lamp (Unicure VB-15201BY- A, manufactured by USHIO INC.) to obtain an optically anisotropic film (1). The film thickness of the resultant optically anisotropic film was measured using a laser microscope and found to be 970 nm.

Comparative Example 1

An optically anisotropic film (2) was yielded in the same conditions as in Example 1 except that the orientation layer was formed and then subjected to the rubbing treatment. The thickness of the orientation layer and optically anisotropic film was each measured using a laser microscope, and it was found that the thickness of the orientation layer was 37 nm, and the thickness of the optically anisotropic film was 985 nm.

[Transparency Evaluation]

The haze value of each of the optically anisotropic films (1) and (2) was measured by a double beam method, using a haze meter (model: HZ-2) manufactured by Suga Test Instruments Co., Ltd. The results are shown in Table 3.

[Optical Property Measurement]

The retardation value of the optically anisotropic films (1) and (2) was measured using a measuring instrument (KOBRA-WR, manufactured by Oji Scientific Instruments). The measurement was made while the incident angle of light into the sample was varied, and the orientation direction of the liquid crystal compound was confirmed. The results are shown in Table 3.

[Measurement of Number of Defects]

The number of defects of the optically anisotropic films (1) and (2) was measured using a laser microscope, and the defects with a size of a diameter of 100 μm or more per 25 $cm^2$ were counted. The results are shown in Table 3.

[Contact Angle Measurement]

The water contact angle on the surface of the orientation layer used in Example 1 and Comparative Example 1 was measured, using Drop Master 700 manufactured by Kyowa Interface Science Co., Ltd., by a liquid droplet method (liquid volume: 1.1 μL). Also, a contact angle when the composition for forming an optically anisotropic layer (1) was dropped to the surface of the orientation layer, a contact angle of water on the surface of the optically anisotropic film (1), and a contact angle of water on the surface of the optically anisotropic film (2) were measured by the same method. The results are shown in Table 4.

TABLE 3

|  | Orientation | Haze (%) | Number of defects (piece) |
| --- | --- | --- | --- |
| Example 1 | Vertical orientation | 0.24 | 2 |
| Comparative example 1 | Vertical orientation | 0.31 | 15 |

TABLE 4

|  | Water contact angle on surface of orientation layer (°) | Contact angle of composition for forming an optically anisotropic layer (1) on surface of orientation layer (°) | Water contact angle on surface of optically anisotropic film (°) |
| --- | --- | --- | --- |
| Example 1 | 78.6 | 3.2 | 85.1 |
| Comparative example 1 | 67.3 | 2.5 | 84.8 |

The optically anisotropic film yielded in Example 1 had less defects.

INDUSTRIAL APPLICABILITY

According to the present invention, an optically anisotropic film in which defect occurrence is suppressed can be produced.

DESCRIPTION OF REFERENCE SIGNS

1, 1': Retardation film
2, 2': Polarization film
3, 3': Adhesive layer
4a, 4b, 4c, 4d, 4e, 4, 4': Polarizing plate
5, 5': Adhesion layer
6: Liquid crystal panel
10a, 10b: Liquid crystal display device

The invention claimed is:

1. A laminated body comprising a substrate, an optically anisotropic film and an orientation layer disposed between the substrate and the optically anisotropic film, wherein the orientation layer provides orientation regulating force to vertically orient liquid crystal compounds without being subjected to orienting treatment, and wherein a contact angle of water with a surface of the orientation layer adjacent to the optically anisotropic film is from 70° to 90°, and wherein the optically anisotropic film is formed from a composition having a contact angle on the surface of the orientation layer of from 0° to 10°.

2. The laminated body according to claim 1, wherein the orientation layer comprises at least one kind of orienting polymer selected from polyimides and polyamic acids.

3. The laminated body according to claim 1, wherein the orientation layer comprises an orienting polymer having at least one kind of substituent selected from a silicon atom and a fluorine atom.

4. The laminated body according to claim 1, wherein the optically anisotropic film is for an in-plane switching (IPS) liquid crystal display device.

5. A method for producing the optically anisotropic film, comprising continuously forming the orientation layer for the optically anisotropic film according to claim 1 on a roll-form substrate, and continuously forming the optically anisotropic film on the orientation layer for the optically anisotropic film.

6. A polarizing plate having the laminated body according to claim 1.

7. A display device, comprising the laminated body according to claim 1.

* * * * *